United States Patent
Burley, IV et al.

(10) Patent No.: US 10,553,109 B2
(45) Date of Patent: Feb. 4, 2020

(54) MOBILE TRAFFIC VIOLATION DETECTION, RECORDING AND EVIDENCE PROCESSING SYSTEM

(71) Applicant: Drive Safe Enforcement, LLC, Baltimore, MD (US)

(72) Inventors: William Milton Burley, IV, Kingsville, MD (US); Norman Henry McCarthy, Fallston, MD (US); Micha Gerstenberg, Springfield, VA (US)

( * ) Notice: Subject to any disclaimer, the term of this patent is extended or adjusted under 35 U.S.C. 154(b) by 0 days.

(21) Appl. No.: 16/361,008

(22) Filed: Mar. 21, 2019

(65) Prior Publication Data

US 2019/0318621 A1   Oct. 17, 2019

Related U.S. Application Data

(63) Continuation of application No. PCT/US2017/052737, filed on Sep. 21, 2017.
(Continued)

(51) Int. Cl.
*G08G 1/017*   (2006.01)
*G06Q 50/26*   (2012.01)
(Continued)

(52) U.S. Cl.
CPC ............ *G08G 1/0175* (2013.01); *G01S 19/14* (2013.01); *G06Q 50/26* (2013.01); *G08G 1/04* (2013.01);
(Continued)

(58) Field of Classification Search
None
See application file for complete search history.

(56) References Cited

U.S. PATENT DOCUMENTS

| | | | | |
|---|---|---|---|---|
| 5,948,038 A | * | 9/1999 | Daly | G08G 1/04 340/933 |
| 6,573,929 B1 | * | 6/2003 | Glier | G07B 15/06 340/933 |

(Continued)

OTHER PUBLICATIONS

McCartt, Kidd and Teoh, "Driver Cellphone and Texting Bans in the United States: Evidence of Effectiveness", Ann Adv. Automotive Med., Mar; 58:99-114 (2014).

*Primary Examiner* — Rebecca A Volentine
(74) *Attorney, Agent, or Firm* — Royal W. Craig; Gordon Feinblatt LLC

(57) ABSTRACT

A system and method for traffic violation detection using a mobile vehicle-mounted unit (20) with multiple imaging cameras (32-37), for recording and processing as evidence. The mobile unit (20) includes a monitoring device (60) that stores videos locally on a hard drive (62), and an input device (65) by which the operator flags potential infractions observed visually and compile a potential infraction log including links to relevant video frames, date and time, and geolocation. At the end of the operator's shift, the infraction log and videos are uploaded to a data vault (80) for video screening of the potential infractions by a desk operator who compiles a listing of apparent infractions inclusive of time/date, location, violation type, vehicle plates, and a URL link to the data vault (80). This listing is transmitted to police (52) running a web application (55) who can double-check and verify suspected infractions and directly compose a traffic citation.

20 Claims, 9 Drawing Sheets

Related U.S. Application Data

(60) Provisional application No. 62/397,612, filed on Sep. 21, 2016.

(51) Int. Cl.
*H04L 29/08* (2006.01)
*H04N 5/225* (2006.01)
*H04N 5/247* (2006.01)
*H04N 9/87* (2006.01)
*G08G 1/04* (2006.01)
*G01S 19/14* (2010.01)
*G01S 19/42* (2010.01)
*H04L 12/10* (2006.01)

(52) U.S. Cl.
CPC ........... *H04L 67/02* (2013.01); *H04N 5/2253* (2013.01); *H04N 5/247* (2013.01); *H04N 9/87* (2013.01); *G01S 19/42* (2013.01); *H04L 12/10* (2013.01)

(56) References Cited

U.S. PATENT DOCUMENTS

| | | | |
|---|---|---|---|
| 6,914,541 B1* | 7/2005 | Zierden | G08G 1/052 340/933 |
| 2002/0036572 A1 | 3/2002 | Yamaki et al. | |
| 2002/0141618 A1 | 10/2002 | Ciolli et al. | |
| 2002/0186297 A1* | 12/2002 | Bakewell | G08G 1/0175 348/118 |
| 2003/0214585 A1 | 11/2003 | Bakewell | |
| 2004/0222904 A1 | 11/2004 | Ciolli | |
| 2004/0252193 A1 | 12/2004 | Higgins | |
| 2011/0077028 A1* | 3/2011 | Wilkes, III | B60W 50/14 455/456.3 |
| 2012/0307064 A1* | 12/2012 | Schenken | G08G 1/0175 348/149 |
| 2016/0144788 A1* | 5/2016 | Perrin, III | B60R 1/00 348/148 |
| 2018/0293684 A1* | 10/2018 | Ye | G06Q 50/265 |

\* cited by examiner

MOBILE TRAFFIC VIOLATION DETECTION, RECORDING AND EVIDENCE PROCESSING SYSTEM

CROSS-REFERENCE TO RELATED APPLICATION(S)

The present application is a continuation of PCT/US2017/052737 filed 21 Sep. 2017, which derives priority from U.S. Provisional Patent Application 62/397,612 filed 21 Sep. 2016.

BACKGROUND OF THE INVENTION

1. Field of the Invention

The present invention relates to video-based traffic enforcement and, more particularly, to a mobile traffic violation detection and recording system for traffic violations to facilitate third party assistance in enforcing traffic violations especially infractions of hands free laws against texting while driving, talking on a mobile phone while driving, and distracted driving.

2. Description of the Background

Scarcening police resources have left relatively few officers available for traffic enforcement. Nevertheless, the manual nature of issuing traffic citations is inefficient, labor-intensive, and costly. Not surprisingly, most violators are never caught or prosecuted, and traffic laws do not deter bad driving habits. This is especially apparent in states that have banned texting while driving and/or talking on a cell phone while behind the wheel. Studies have shown that enforcement of such laws is limited and ineffective. McCartt, Kidd and Teoh, "Driver Cellphone and Texting Bans in the United States: Evidence of Effectiveness", Ann Adv. Automotive Med., March; 58: 99-114 (2014).

Over the years, cameras have been introduced to improve the detection, documentation, and prosecution of traffic violations. Speed cameras support the prosecution of speeding violators by providing evidence of speeding and red-light running. These devices develop documentary evidence, which is processed later by police, government, or private contractor personnel, producing citations that are mailed to the registered owner(s) of the cited vehicle based on the associated license plate and vehicle images. In the case of red light violations, the camera is used in conjunction with vehicle detection systems, which are usually in-ground (in-road) sensors like inductive loops that detect the presence of a vehicle at a particular point on the roadway. The camera system is also connected to the traffic signal controller, generally for the purpose of coordinating the red feed associated with the red signal phase. In principle, an image of an offending vehicle is taken when that vehicle is detected entering the intersection, and/or remaining in the intersection during the red signal phase. A common practice is to take two (2) images of a vehicle as it progresses through the intersection in order to provide sufficient evidence for a prosecution. Radar-triggered camera systems operate in a similar fashion. However, triggering from radar or lighting signals is entirely ineffective against violators of hands free laws.

Texting while driving is an escalating problem, estimated to cause 1,600,000 accidents per year (National Safety Council), 330,000 injuries per year (Harvard Center for Risk Analysis Study), eleven teen deaths daily (Institute for Highway Safety Fatality Facts), and is singularly responsible for nearly 30% of all vehicle collisions (National Safety Council). According to the National Safety Council, more than 100,000 automobile crashes a year involve texting while driving, and according to an AT&T Wireless survey, 75% of teens say texting while driving is "common" among their friends. Further surveys found that 49% of licensed drivers admit to texting while behind the wheel. Within a decade texting and other cellphone distractions have arguably become our number-one public health hazard, statistically surpassing that of drunk driving. Something needs to be done, and a solution is herein disclosed in the form of a mobile traffic violation detection and recording system for the enforcement of traffic violations especially infractions of hands free laws against texting while driving, talking on a mobile phone while driving, and distracted driving.

SUMMARY OF THE INVENTION

It is, therefore, an object of the present innovation to provide a novel mobile traffic monitoring system and method which addresses and supports public safety and law enforcement for vehicle violations.

It is another object to provide a system and method for traffic violation detection using a vehicle-mounted mobile unit with multiple imaging cameras to deliver a 360-degree view, for recording and processing as evidence, a secure video data vault, and a third party application server for allowing two-tier review of potential infraction videos.

In accordance with the foregoing objects, the present system includes the vehicle-mounted mobile unit with a vehicle-mounted imaging unit comprising multiple cameras to deliver a 360-degree view, for recording and processing as evidence. A secure video data vault is also disclosed, as well as a third party application server for implementing a workflow comprising a two-tier review of potential infraction videos.

The mobile unit includes a controller that tags each frame of the multiple digital video streams with a date/time and geolocation stamp, and stores the tagged videos locally on a hard drive. The mobile unit provides the vehicle operator with an input device by which the operator can flag potential infractions observed visually, in which case the controller logs potential infractions inclusive of time and date stamp. At the end of the vehicle operator's shift, the infraction log and videos are uploaded to a third party data vault for video screening of the potential infractions. A desk operator labels apparent infractions inclusive of time/date, location, violation type, vehicle plates, and a URL link to the data vault, then the listing is transmitted to police. Using a standard computer, police can click on each link thereby initiating a user interface to verify each traffic infraction individually or synchronously viewing any/all of the relevant video streams or any frame/portion thereof. The user interface facilitates composition of a police citation, while PKI encryption techniques are embedded throughout the process to ensure evidentiary chain of custody. The system and method is well-suited for third-party detection of vehicle drivers in violation of the no texting, no talking, hands free distracted driving laws and any other violation while facilitating the preservation of evidentiary support.

Other objects, features, and advantages of the present invention will become more apparent from the following detailed description of the preferred embodiments and certain modifications thereof.

BRIEF DESCRIPTION OF THE DRAWINGS

Other objects, features, and advantages of the present invention will become more apparent from the following detailed description of the preferred embodiments and certain modifications thereof when put forth with the accompanying drawings in which.

DETAILED DESCRIPTION OF THE PREFERRED EMBODIMENT

The present invention is a traffic violation detection and recording system including both hardware and computer-implemented process to facilitate third party assistance in enforcing traffic violations especially infractions of hands free laws against texting while driving, talking on a mobile phone while driving, and distracted driving.

Figure 1:
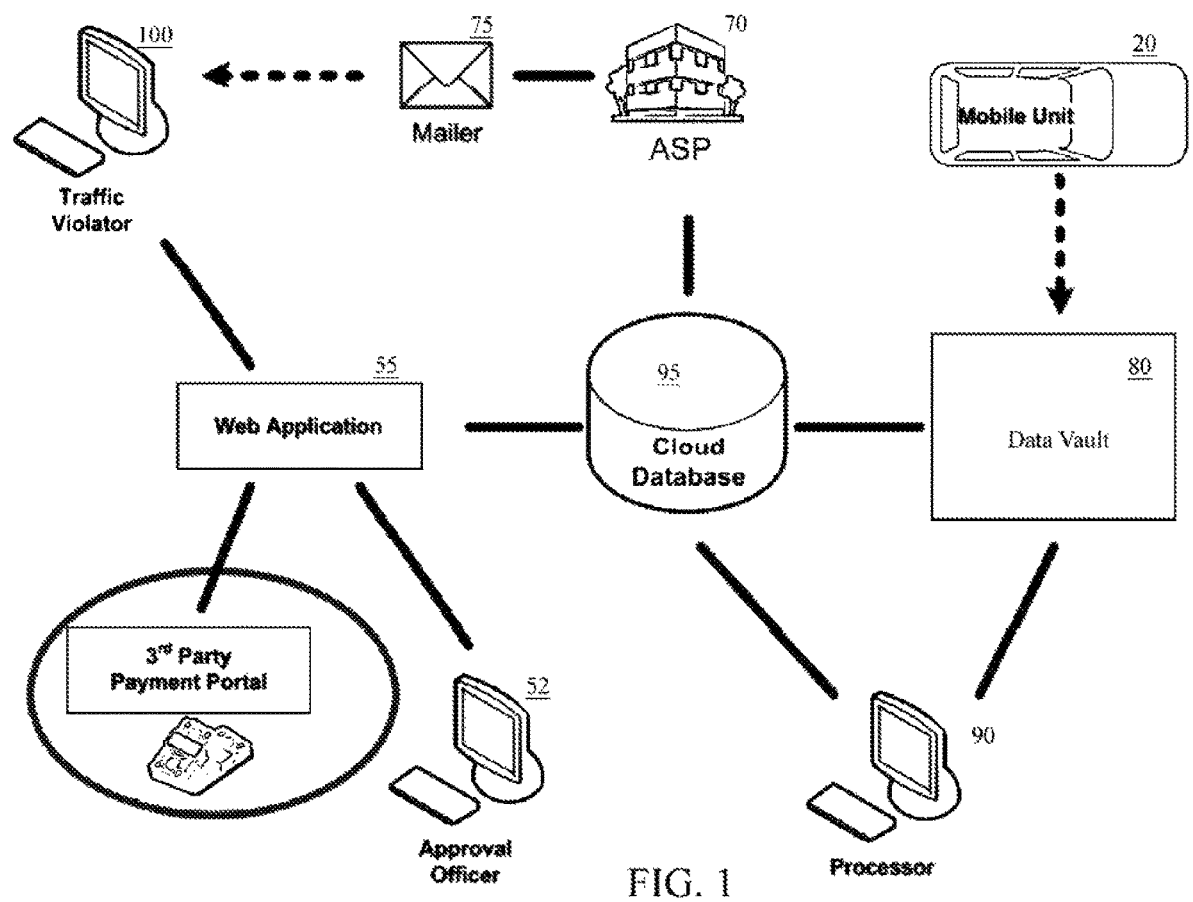
FIG. 1 is a block diagram of the traffic violation detection and recording system 10 inclusive of data vault 80 and third party thin client workstation 90.

FIG. 1 is a block diagram illustrating the process flow of the present system. The system and process includes a plurality of mobile units 20, each generally comprising vehicle-mounted cameras and a recording system configured to capture multiple surveillance inputs and other related data onto a mass storage medium during the course of one shift. The mobile unit 20 continuously captures images, while moving with traffic or while stationary, and at any given time the operator of the mobile unit 20 can designate a potential violation of hands free, no texting, no talking, or distracted driving laws.

At the end of a day's shift, the stored video/data is automatically or manually uploaded to a data vault 80 for access by a third party thin clients 90 and then law enforcement 70. The data vault 80 is a secure server system at a physical facility local to the mobile units 20. Once the video/data is uploaded it is available for processing. Third party users working for an application service provider (ASP) 70 and using remote "thin client" computers 90 (lightweight browser-based computers built to connect to a server from a remote location) may log in and review the video feeds of flagged violations over the shift. Violations that were identified during the shifts are edited into smaller video clips and images that then are bundled into discrete violation records. Those violation records are uploaded into a cloud database 95 for further review. Next, law enforcement officials or "approval officers" 52 may access the system via web browser 55 to access the violation records in cloud database 95 to either approve or dismiss aforementioned violation records. Finally, the ASP 70 automatically retrieves all approved violations from cloud database 95 and sends citations via an automated mail processor 75 using mail processing machines such as the Pitney Bowes Paragon II®. Citations are mailed to the traffic violator 100. After receiving the citation, the traffic violator 100 can then log onto the web application 55, review the violation's video clips and images, and directly pay the violation online through a third party payment portal. Note that both approval officers 52 and violators access the system via web browser 55 via a separate web server to provide another layer of separation from the vault 80. The combination of the third party reviewers 90 plus authorized approval officers 52 subjects the video/photo evidence to a secure two-tier review process, allowing individualized infractions and violations to issue directly. The two-tier review process reduces the video footage to pertinent images and video segments including date, time, location of violation and other applicable information along with license plate registration information extracted from the images. The infractions are routed and electronically transmitted to the appropriate jurisdictions to be reviewed by law enforcement, resulting in either confirmation of the violation or dismissal of the violation. Once confirmed as a violation, the registration information is obtained and the violation may be processed and sent to the violator. If it is not confirmed it will be dismissed.

Figure 2:
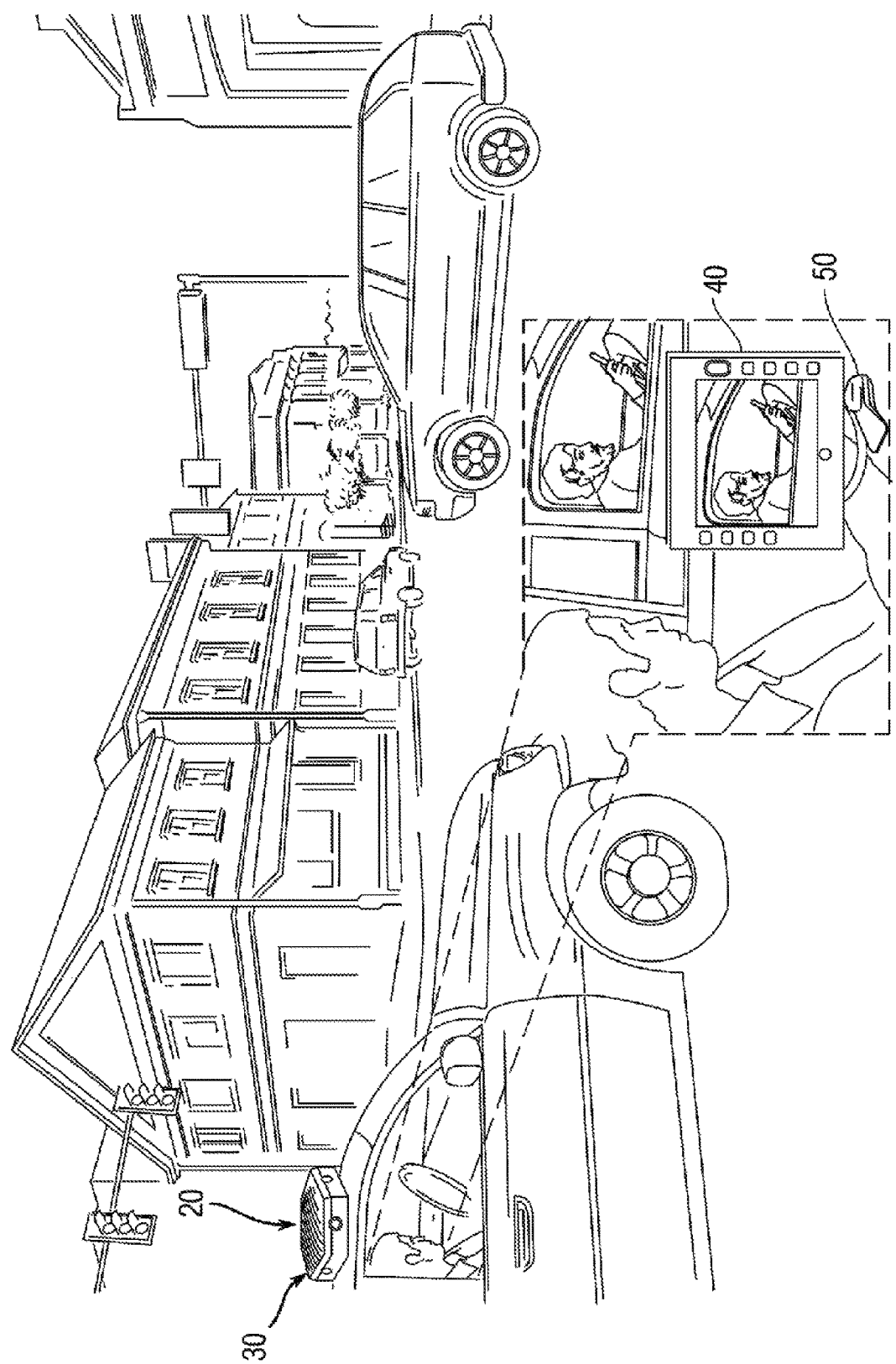
FIG. 2 is a perspective view of a mobile vehicle-mounted unit 20 according to the present invention.

FIG. 2 is a perspective view of a mobile vehicle-mounted unit 20 according to the present invention. The mobile unit 20 purpose is to capture all data that pertains to the violation, inclusive of at least the following:

Multiple video streams: preferably, six (6) video streams are constantly captured simultaneously on 6 cameras and written out to a recording device;

GPS location: GPS location is sampled and written out at a rate of 2 locations per second;

Time stamps: time stamps are triggered manually by the driver or passenger of the car, to mark a specific instance of time when a suspected violation occurs. This helps finding violations later in post processing.

Figure 3:
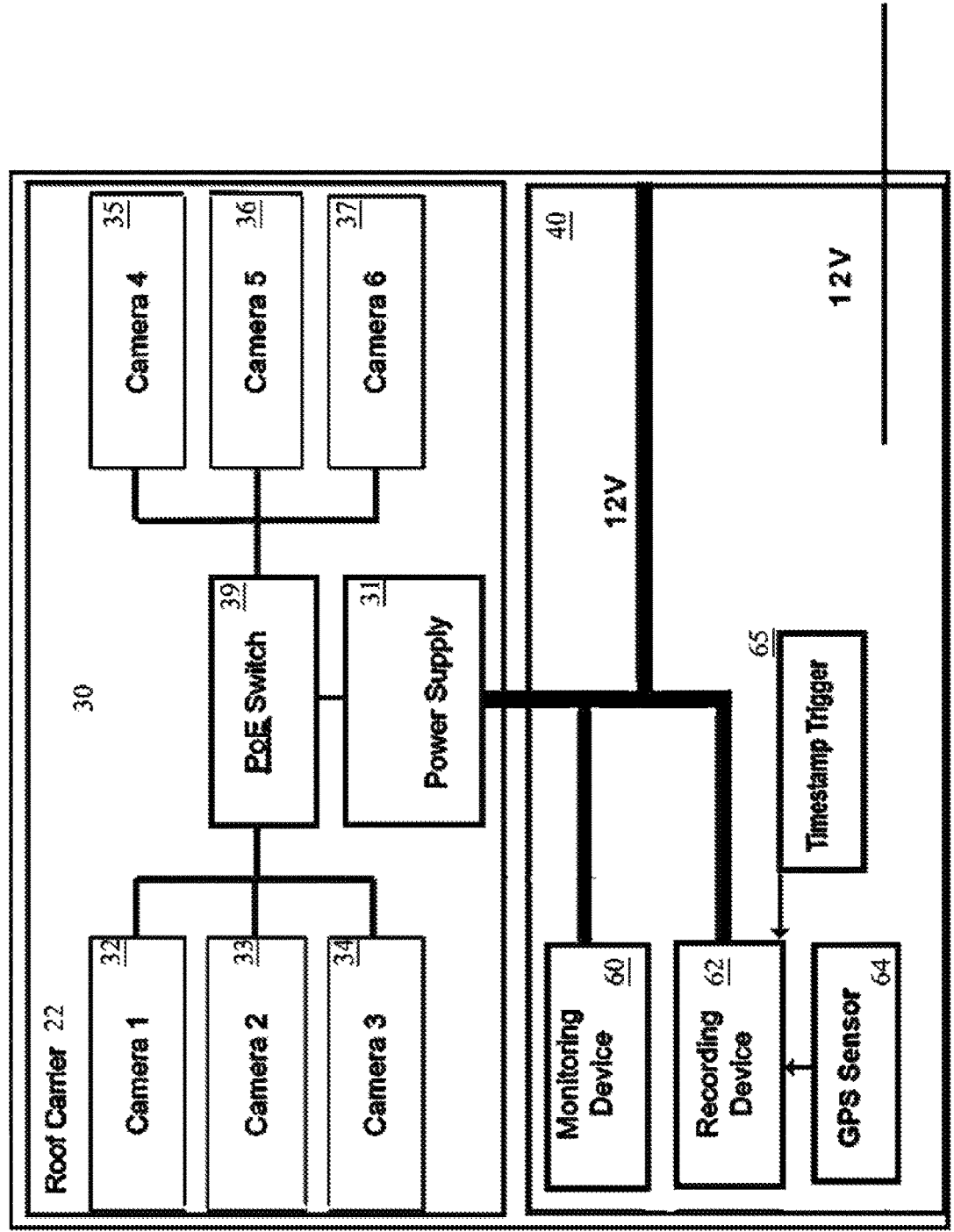
FIG. 3 is a block diagram of the mobile vehicle-mounted unit 20 of FIG. 2.

Toward this end, FIG. 3 is a block diagram of the mobile vehicle-mounted unit 20 according to an embodiment of the invention. The mobile unit 20 includes an exterior roof-mounted imaging unit 30 and an interior processing unit 40. The roof-mounted imaging unit 30 includes a cartop carrier enclosure for six cameras 32-37 and electronics, the latter being connected to the interior unit 40 by a 12V power supply and ethernet cable. The roof-mounted imaging unit 30 also includes a dual redundant power supply 31 that steps up the 12V vehicle supply to provide a stable 48 VDC for a nine (9) port Power-over-Internet (POE) Switch 39 (8 PoE Ports|1 Uplink Port). Besides terminating the ethernet cable from the car interior, the POE network switch 39 provides power and data connectivity to the plurality of cameras 32-37 that are mounted outside the cartop carrier 22. All components are rated for extended temperature ranges and shock resistance. The carrier box 22 preferably comprises a weatherproof housing that may be attached by suction, magnetics or permanently to the roof of the vehicle.

In the illustrated embodiment the exterior imaging unit 30 defines six compartments housing six angularly-offset video cameras 32, 33, 34, 35, 36, 37 for providing a 360-degree field of view.

Figure 4:
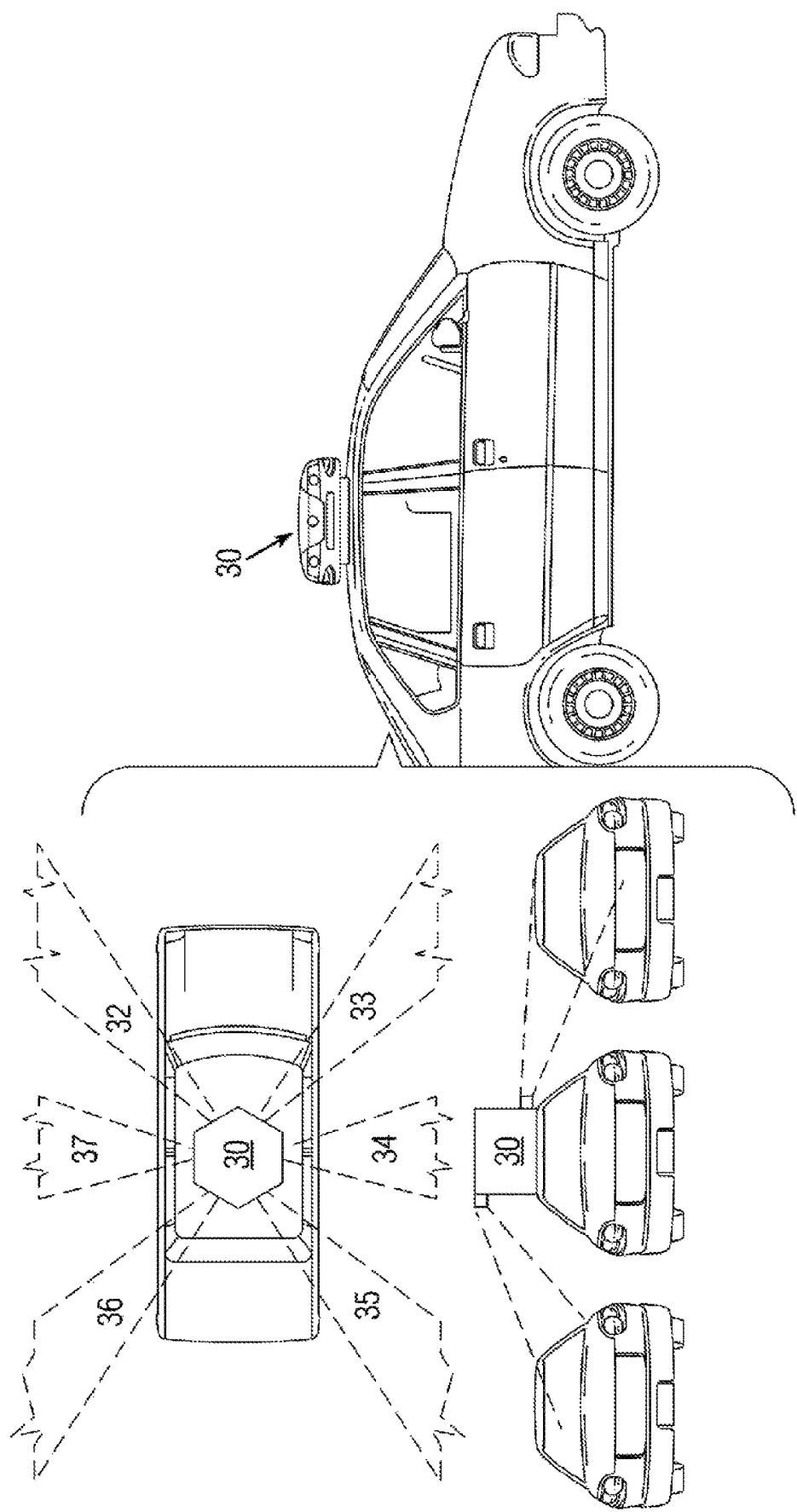
FIG. 4 is a perspective composite drawing illustrating the preferred camera orientation.

FIG. 4 is a perspective composite drawing illustrating the preferred camera orientation. Each side of the car has three cameras mounted, one pointing diagonal to the driving direction, one 45 degrees sideways to the front, and one 45 degrees sideways to the rear. This particular configuration provides direct views inside the neighboring car's windows, and captures additional view points as well as the license plates. The diagonal cameras (mounted at the four corners of the carrier box 22 are mounted at the lowest possible ("baseline") elevation to provide the best possible angle to capture the license plate. The driver-side perpendicular camera is also mounted at a low, e.g., baseline position so the left side neighboring car's driver can be captured through its passenger window. However, the right-side perpendicular side camera is mounted at a first vertical elevation higher than baseline (e.g., 5-12") to provide maximum insight into the neighboring car's window, in case the driver holds the phone at a low position (e.g. while writing text messages). All cameras 32-37 employ 8 mm zoom lenses, which provides a FOV of about 40 degrees. Despite such a narrow field of vision (less than 180 degrees) this allows a higher resolution capture of the target which can be zoomed in on at the center of the shot. It also results in less moving background when the target is in center. Since zoom lenses provide higher resolutions on the targets (plates and persons), it is not necessary to use an ultra-high resolution cameras (such as 8 MP or 4 MP). Such cameras would either loose detail due to compression, or provide more data than can reasonably be stored and processed. The preferred camera is an AXIS® P3915-R which is specially designed for mobile video surveillance with 1080p resolution producing images with 1920×1080 pixels per unit. The AXIS® uses digital pan-tilt-zoom. The exterior imaging unit 30 may alternately utilize low lighting or night vision type cameras 32-37 that require no flash illumination. One skilled in the art will understand that the number of cameras 32-37 is not limited to six, but could be any number within a range of from four-to-sixteen depending on user preference.

Referring back to FIG. 3, the interior processing unit 40 is a surveillance video recording system (SVRS) comprising a monitoring device 60, a mass storage device 62, a GPS sensor 64, and infraction tagger 65. Monitoring device 60 may be a laptop or other computer device with attached monitor. Infraction tagger 65 may be any user input device. Mass storage device 62 may be a suitable removable hard drive, RAID array or high capacity media device. The interior SVRS unit 40 inclusive of monitoring device 60, mass storage device 62, GPS sensor 64, and infraction tagger 65 are preferably dash-mounted inside the vehicle to provide a display of live video and navigation information to the driver on a real-time basis as is represented by FIG. 3. The monitoring device 60, mass storage device 62, GPS sensor 64, and infraction tagger 65 are connected by Ethernet to POE switch 39 as shown. Mass storage device 62 has the capability of recording all camera data continuously to a removable medium for the duration of the shift. In operation the monitoring device 60 runs surveillance software that initiates cameras 32-37 to record video to mass storage device 62, and for each a new video file is started every 2-5 minutes, so that in case of a power failure, no more than 5 minutes of video is lost. The exact interval is preferably configurable and set differently for every camera, so that except for the system start, all cameras start a new recording at different staged-times to provide overlap and reduce excessive processor usage that might otherwise result in lost frames.

The video streams from cameras 32-37 are sent directly through POE switch 39 to mass storage device 62, and are also sent as secondary lower resolution video streams to the monitoring device 60. The monitoring device 60 polls GPS sensor 64 and when initiated by trigger 65 writes timestamps and GPS locations, respectively, into separate files on the mass storage device 62 medium. The monitoring device 60 may be used by the driver or passenger to monitor all cameras 32-37 in real time. Brightness and other camera parameters can be adjusted from monitoring device 60. The mass storage device 62 preferably directly records the time-stamped geo-located video for subsequent playback by direct memory access (DMA), a known feature of computer systems that allows access the mass storage device 62 independently of the monitoring device 60. The mass storage device 62 includes the necessary circuitry to receive the multiple video input streams from the individual cameras 32-37 in the exterior imaging unit 30 and to continuously write and store video streams on the mass storage device 62. Though programmable from monitoring device 60, the cameras 32-37 are default-set at a camera sampling rate (e.g., 15 frames per second for 1080p uncompressed 1920× 1080 resolution 8-bit RGB video), and this video is stored raw as individually-imaged frames each time-tagged and geo-located in metadata by GPS coordinates. Each camera 32-37 output is recorded at approximately 15 Mb/s and therefor produces approximately 67.5 gigabytes per shift per camera. Six such video streams recorded over a ten-hour shift require approximately 405 gigabytes or 377 GiBs per shift.

One skilled in the art will understand that in reviewing the videos, the co-recorded GPS coordinates can be immediately correlated with the location of the vehicle when an infraction occurs, and the time/date data stamp from all the video channels may be used to synchronize the various camera views chronologically or geographically as will be described. The video files themselves necessarily include images of the vehicle driver and license plate. The images of the driver and plate/vehicle associated with the violations are identifiable and can provide evidence of the identity of the driver and vehicle registration associated with the violation.

The mass storage device 62 may be any suitable high capacity (preferably greater than 400 gigabyte, and most preferably a 512 gigabyte medium) such as a hard drive or flash storage. In practice, a removable 512 GB SD card serves well, saving space, allowing recording of six cameras at 15-20 Mbps 1080 video for about ten hours, and allowing convenient end-of-shift uploading. However, one skilled in the art will readily understand that other storage solutions will suffice, inclusive of Integrated Drive Electronics (IDE) and Enhanced Integrated Drive Electronics (EIDE) drives, Serial ATA (SATA) drives, their Parallel Advanced Technology Attachment (PATA) counterparts, Small Computer System Interface (SCSI) drives, and/or Solid State Drives (SSD). Rather than manual upload, some storage arrays have wireless transfer capabilities such as a Wireless Plus Mobile from Seagate™. This type of drive is battery powered and offers wireless connectivity and serves as a Wi-Fi hub, which would allow wireless downloading to data vault 80 at end-of-shift. In all such cases the mobile unit 20 captures multiple surveillance inputs and other related data onto mass storage device 62 during the course of one shift. At the end of the shift, the data is unloaded manually or wirelessly to the data vault 80, which is a physical facility, local to all mobile units 20. Once the data has been unloaded, it is available for processing.

Figure 5:
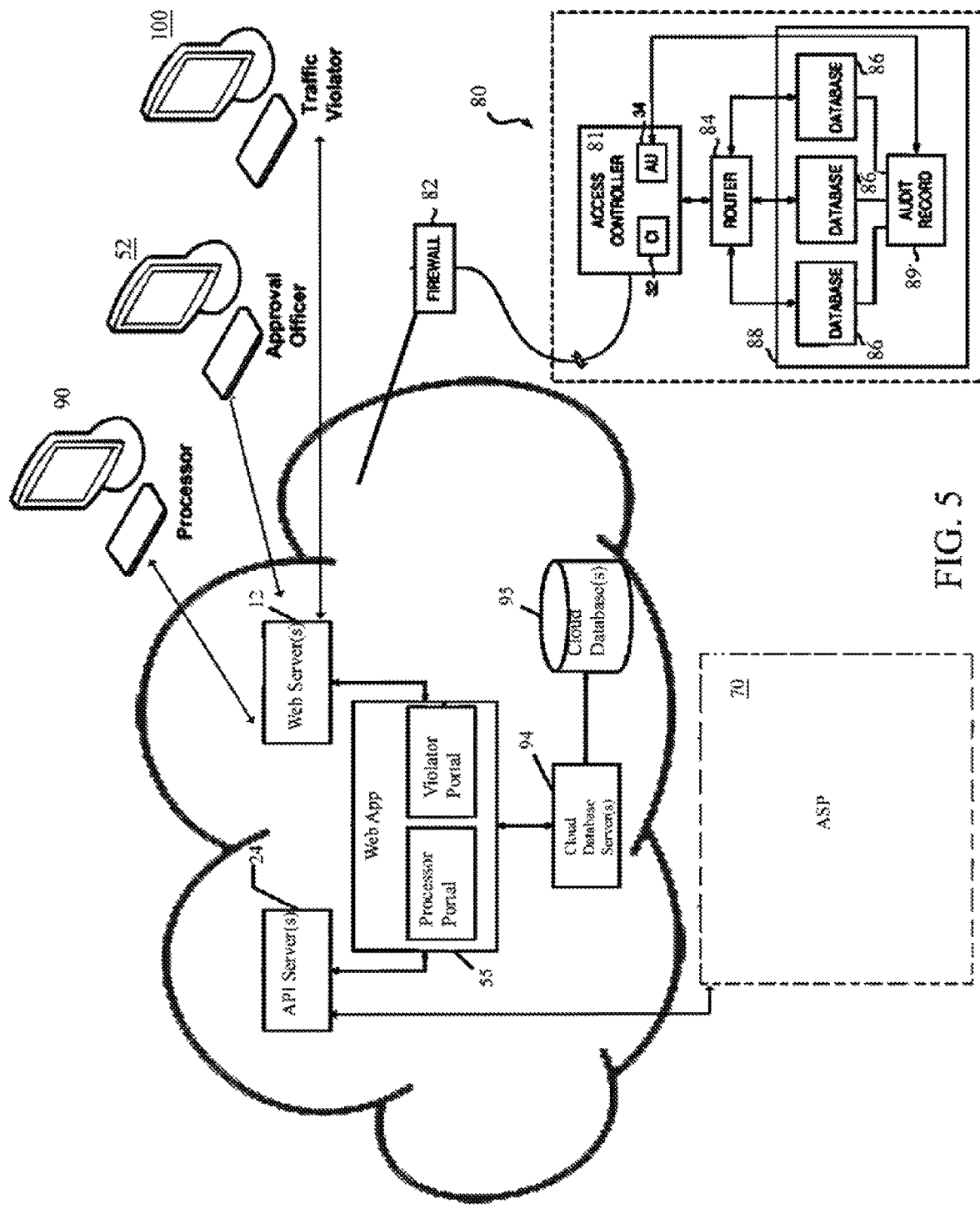
FIG. 5 is a block diagram of the data vault 80 and ASP 70 architecture of FIG. 1.

FIG. 5 is a more detailed block diagram of the data vault 80 and ASP 70 architecture. The data vault 80 is a web-enabled server connected to the internet and hence cloud database 95 through a secure gateway. The data vault 80 is designed to keep the video captures in a centralized secure database. The data vault 80 is preferably constructed behind one or more firewalls 82, and may be any web-enabled server or server farm utilizing, for example, a commercially-available vault registry solution. An example of a repository is a Vault Registry™ product manufactured by IBM™ configured for the electronic transmission and storage of data via access through secure web portals accessible only by authorized users such the vehicle operator. For purposes of description the illustrated data vault 80 includes data storage elements 86 positioned at a physically isolated area 88 defining a vault. In the exemplary implementation, a data storage element 86 comprises one or more computer servers containing memory arrays of large capacities appropriate for storing mass video data. In the exemplary implementation, while the area forming the vault 80 is physically isolated, the area is permitting of expansion to provide for scalability of storage capacity. The assembly further includes an access controller 81 coupled to firewall 82. The access controller 81 operates to control access to the vault 80 and to the data storage elements 86 therein to authenticate authorized thin clients 90. The access controller 81 is coupled to a router 84, of conventional configuration, that, in turn, is coupled to the data storage elements 86.

The ASP 70 relies on cloud computing or "Internet-based computing" where services such as servers, storage and applications are delivered to the ASP 70 computers and devices through the Internet. Consequently, requisite database servers, application servers, and web servers are not located within the ASP 70 domain, but rather in the cloud so that geo-redundancy is achievable. However, the ASP 70 maintains web application 55 and cloud database 95 (see FIG. 1) in the cloud for processing violations (sending citations) and management tasks, and maintains a resident routing database which stores data authentication and verification information (usernames and passwords) correlating to authenticated approval officers 52, processors 90 and violators 100, as well as administrators, all of whom may access their dedicated portals of web application 55 via cloud-based server(s) 12. The cloud-based server(s) 12 are preferably accessed exclusively by a Representational state transfer (REST) or RESTful web service interface that allows requesting systems to access and manipulate textual representations of Web resources using a uniform and pre-defined set of stateless operations. The REST Service Interface is also located in cloud 90. The cloud also comprises one or more API server(s) 24, and database servers 94 in communication with cloud database 95. The database server(s) 94 run database management software to provide cloud-based database services. Database management systems (DBMS) frequently provide database server functionality, and some DBMSs (e.g., MySQL) rely exclusively on the client-server model for database access. Thus, database server(s) 94 may be, for example, SQL servers running MySQL (a popular open source database). Other examples of suitable database servers are Oracle™, DB2™, Informix™, Ingres™, and SQL Server™. The application program interface (API) server(s) 24 and the web server(s) 12 provide programmatic and web interfaces respectively via the cloud for accessing the web application 55, and presenting a processor portal to approved thin clients 90 that presents a user display to desk operators for second tier review of the potential infractions and videos. The web application 55 also includes a law enforcement user display for police for final review of the potential infractions and videos, and for assisting with issuance of citations, and a violator 100 portal for payment of fines.

Figure 6:
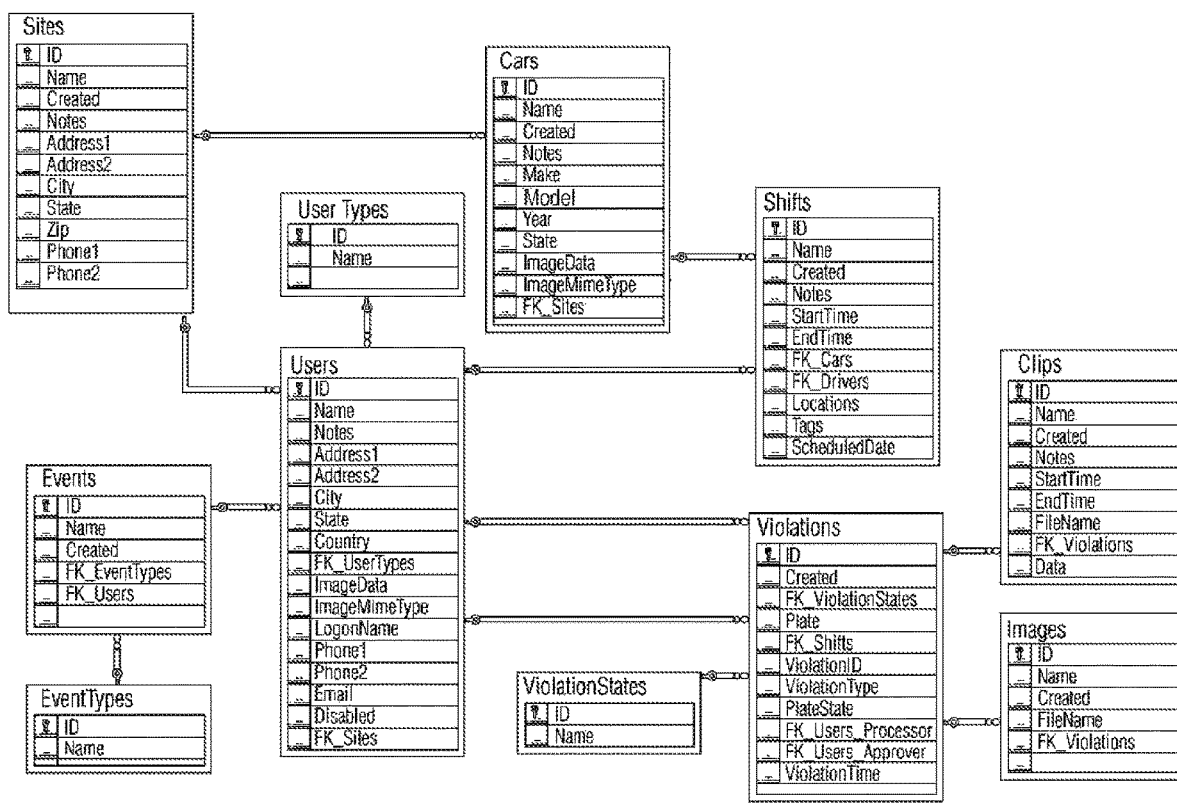
FIG. 6 is an entity diagram illustrating the database design.

FIG. 6 is an entity diagram illustrating the database design for database 15, which includes separate tables for "Sites", "Cars", "Plates", "Events", "Shifts", "Clips", "Images", etc. all as shown. Record entries for each table are also as shown. The following is a brief description of the most important database tables:

| Table Name | Description |
| --- | --- |
| | Application of: Burley et al. |
| Users | Any user that has log on credentials to the system. This does not include violators. Examples: Shift supervisor Driver Processor Approval Officer HQ User |
| Sites | Each independently operated Site that is registered with the system. This table stores general information about sites. Most other tables relate to this table directly or indirectly. This enables the system to give users only visibility of a limited number of sites. |
| Cars | Mobile units that are registered with the system at a particular site. General car registration information is stored. |
| Shifts | A mobile unit can only operate, i.e. collect data, when a "Shift" has been created. A shift Includes the start/end of capture, driver, and car. All captured data can be tracked back to that shift. Each shift has exactly one car and one driver. |
| Violations | When a shift is processed, "Violations" are created in the database. A violation is a collection of video clips and representative still images (stored in separate tables). A Violation includes status flags indicating workflow states: InEntry: The processor is still working on it OfficalReviewPending: The violation creation is completed but no approval officer has reviewed it yet Approved: The violation has been approved by the approval officer Dismissed: The violation has been dismissed by the approval officer WaitingForPayment: The citation has been sent Closed: The payment has been received |
| Events | All actions of the system are recorded in this table, so that later on a complete audit is possible. |

Using the above relational design, it is possible for the ASP 70 to manage independently-operated "Sites" which can manage their own fleet of mobile units 20 and users to produce video material. The later stages in the workflow also use this same database design to access the video material, add violation records and clips, and finally send the citation to the violator. In addition, the table below lists the functions of the database 15 from a user perspective.

All timestamps and GPS are then converted to a compact binary format and uploaded to the cloud database 95, but not the video footage which remains at vault 80. Since the cameras are recording at an average rate of 15 Mps, the six camera units 32-37 produce approximately 67.5 gigabytes per shift per camera, or collectively approximately 405 gigabytes or 377 GiBs over a ten-hour shift.

| User Type | Actions |
| --- | --- |
| Driver | Start Shift: The driver starts a shift by using the Site Manager Application to prepare the storage media. The database updates the shift record accordingly, by changing shift state, and noting the start time.<br>End Shift: The driver ends a shift by using the Site Manager Application to unload the storage media. The database updates the shift record accordingly, by changing the shift state, noting the end time, and uploading shift related data, such as GPS positions and time stamps (note that the video data remains on the Site at all times) |
| Processor | Start Shift: The processor gets a shift to work on. The database updates the shift record accordingly by changing the shift state.<br>Add Violation: The processor adds a violation to the system by submitting video clips and image records to the database.<br>Complete Shift: The processor marks a shift as completed. The database updates the shift record accordingly by changing the shift state. |
| Approval Officer | Get Pending Violations: The approval officer gets a list of pending violation that he has visibility of.<br>    Get Violation: The approval officer gets a violation that he selected for review<br>    Approve violation: The approval officer marks a violation as approved.<br>Dismiss violation: The approval officer marks a violation as dismissed. |
| Shift Manager | Create/Read/Update/Delete User(s): A shift manager manages drivers<br>Create/Read/Update/Delete Shift(s): A shift manager manages shifts |
| ASP 70 User | ASP 70 Users can manage all aspects of the system:<br>    Create/Read/Update/Delete Calls)<br>    Create/Read/Update/Delete Users(s)<br>    Create/Read/Update/Delete Shifts(s)<br>    Create/Read/Update/Delete Sites(s)<br>ASP 70 Users also have limited access to perform maintenance tasks on violation. That access is restricted to protect the chain of evidence. |
| System Administrator | Full access to the database |
| (Other) | As the system evolves, other user types can be added, that would be allowed to access existing and new system components |

In operation, a vehicle driver will be an authorized employee of a third party service provider that is paid to complete an eight-hour shift. At the start of the shift they are required to log onto the monitoring device 60 by ID and password. Once logged, they patrol and press tagger 65 to tag potential infractions observed visually as shown in FIG. 2. The operator has no control over the recording of video. However, the operator via the tagger 65 and monitoring device 60 maintains a log file of potential infractions. Specifically, upon pressing the tagger 65 the monitoring device 60 creates an entry in the log file inclusive of operator ID number, mobile unit number, date, time and GPS. The shift log file comprising of about one hundred entries is likewise stored locally on mass storage device 62. The operator is trained to flag all potential infractions observed visually. At the end of the vehicle operator's shift, the infraction log and four video streams are uploaded to a third party data vault 80 for video screening of the potential infractions.

When a shift is completed, the driver returns the mobile unit 20 to the vault 80, removes the storage medium from the recording device 62 and plugs it into a receptacle that is connected to the vault 80. Alternatively the transfer may be wireless. Either way, all the shift data is copied to vault 80 inclusive of GPS information, timestamps, and video files.

At this time it would not be reasonable to host a week's worth of data in the cloud database 95. It would also take several hours to upload the raw video files to the cloud database 95, per mobile unit. For those reasons, the high resolution raw footage of all cameras is copied to secondary files that have a lower resolution and frame rate. These "fuzzed" video files stay at vault 80 which is decentralized, located at the sites that they were unloaded at. The thin client 90 accesses the stored video files at vault 80 remotely when violation records are created.

It is extremely important for evidentiary reasons to maintain a secure chain of custody. To accomplish this, the data vault 80 implements a defined security policy (i.e., a set of protective measures that is necessary to prevent unauthorized actions). The data vault 80 uses its security policy to govern upload requests, verifying the identities and authorities of the vehicle operators requesting mobile units 20. The data vault 80 securely retrieves and stores the videos and log file as digitally signed, authenticated, and encrypted electronic data. The data vault 80 also provides for backup and disaster recovery, and ensures that stored information is not lost within a specified time.

Figure 7:
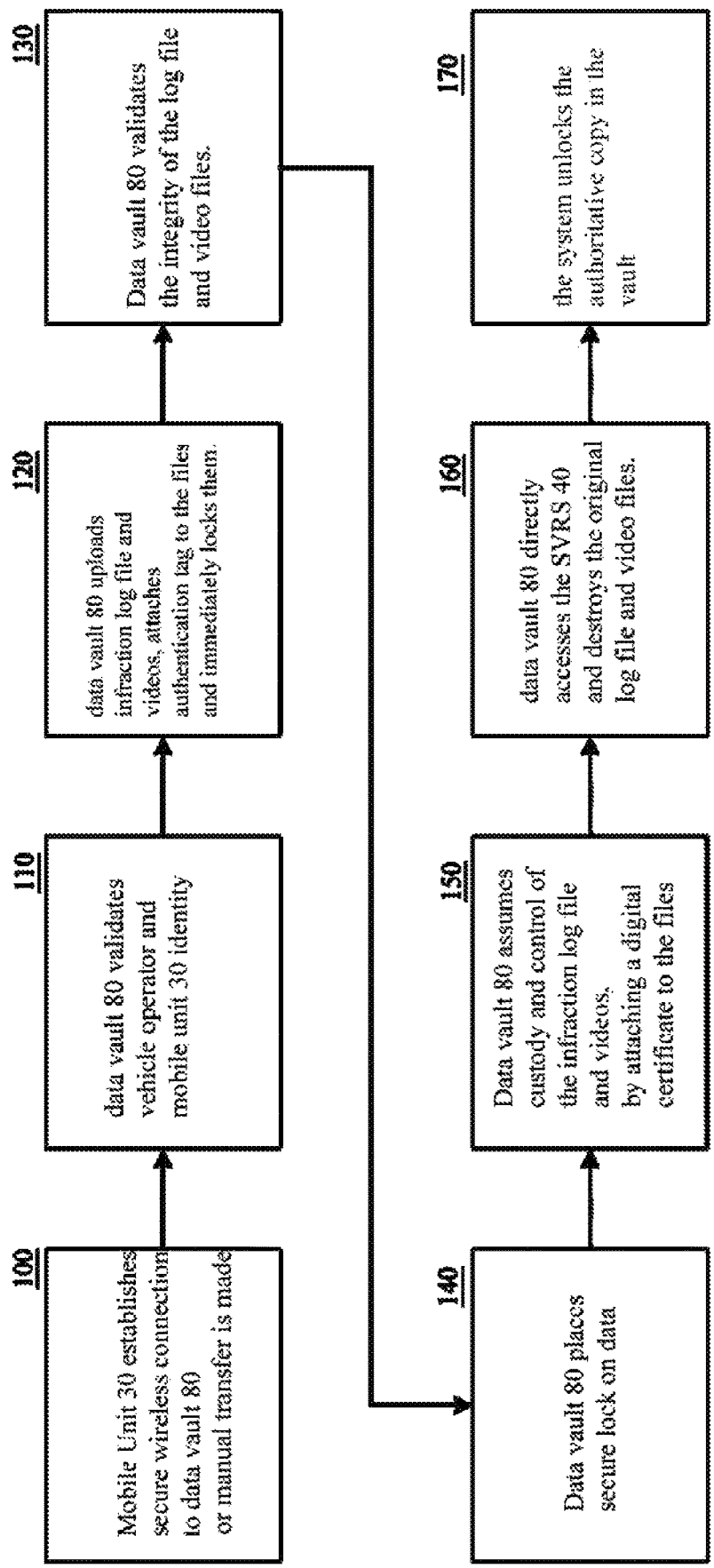
FIG. 7 is a flow diagram of the upload process.

FIG. 7 is a flow diagram of the upload process.

At step 100 the vehicle operator initiates an upload request to data vault 80 from mobile unit 30.

At step 110 the data vault 80 solicits user ID and password, and authenticates the vehicle operator as authorized and the mobile unit 30 number as authorized.

At step 120 the data vault 80 then automatically uploads the infraction log file first, and compares the user ID and mobile unit 30 number therein to those just entered/polled. If the authentication data is consistent, the data vault 80 automatically uploads the infraction log file and original video files.

At step 130, upon successful upload of the infraction log file and videos, the data vault 80 may again validate both vehicle operator and mobile unit 30 identity and rights verify the integrity of the submitted data.

At step 140, upon successful upload of the infraction log file and videos, the data vault 80 places a secure lock on the submitted data, preventing all outside access.

Once it is determined that the log file and video data have not been altered prior to or during submission and that the vehicle operator and mobile unit 30 have the proper authorizations, during step 150 the data vault 80 assumes custody, control, and responsibility of the infraction log file and videos for their preservation by attaching a digital certificate to the files. The digital certificate includes a visible representation such as a watermark that includes the data vault 80 ID, date and time stamp. The data vault 80 digital certificate also digitally tamper seals the data using industry standard digital certificate technology. Preferably, the tamper seal is accomplished with an X.509 digital certificate issued by a certification authority to the data vault 80. The X.509 digital certificate associates the data vault 80 with a public key value. More specifically, the certificate includes at least the vault 80 identity (the certificate owner); the public key associated with the data vault 80, X.509 version information, a serial number that uniquely identifies the certificate, the certification authority, the digital signature of the vault 80, and information about the algorithm used to sign the digital signature. The digital signature applied by the vault 80 eliminates the possibility of unauthorized alteration or tampering subsequent to the original locking. This action by the data vault 80 marks the assumption of custody and control.

At step 160, upon successful deposit, locking and encryption/sealing of the infraction log file and videos, the data vault 80 directly accesses the SVRS 40 and preserves the original log file and video files for evidentiary comparison, if requested.

At step 170, after the entire deposit of the infraction log file and videos has been certified and digitally tamper sealed, the secure lock (step 140) is removed.

Throughout all of the foregoing steps 100-170 each transaction is recorded and it becomes part of an electronic audit trail on the permanent record. The audit trail is associated with the infraction log file and videos, and reflects each step of the process. At this point, after step 170, the infraction log file and videos residing in the data vault 80 are the authoritative digital copies. The data vault 80 thereafter controls access to the infraction log file and videos for the benefit of third party reviewers (to be described) and law enforcement personnel. To maintain a trail, or chain, of evidence the data vault 80 applies version controls to each subsequent authorized request for access, thereby preventing direct modification of any of the data. Any copy of the electronic originals is digitally stamped with at least one forgery-resistant indicium or watermark that clearly identifies the rendered information as a copy of the electronic original held at the data vault 80. The combination of actions by the data vault 80, in conjunction with a protected audit trail 89, can be used at a future date to prove conclusively that the evidence was not altered and provides irrevocable proof of authenticity.

One skilled in the art will understand that other methods of uploading data are available. For example, hard drive 62 may be physically removable from the interior SVRS unit 40. When removable, the hard drive 62 is thereafter taken and connected to the data vault 80 for review of the recorded data at a later time. Alternatively, the recorded files stored on hard drive 62 may be downloaded by cable if the memory device is not removable. In all such cases, the foregoing security precautions are applied, and minor alterations are considered to be within the scope and spirit of the invention provided that there can be no alterations or compression to the video due to federal and state rules of evidence.

Referring back to FIG. 1, the data vault 80 may signal Processor 90 when the data vault 80 has assumed custody of the infraction log file and videos for the benefit of third party reviewers and law enforcement personnel. Vault 80 uploads a copy of the infraction log file to cloud storage 95 and reformats it into a list suitable for use by third party reviewers 52. Note that the ASP 70 is not involved in that communication. Each Data Vault 80 directly communicates shift status changes to the cloud database 95. The reformatted infraction review list comprises a bullet listing of time/date, GPS coordinates, vehicle operator, mobile unit number and a URL link constituting an authorized request to access the video files in data vault 80 to view the videos. As seen in FIG. 1 the Processor thin client 90 investigates each potential infraction, selectively views the videos as shown below, and designates apparent infractions.

Referring to FIG. 1, the Processor thin client 90 logs on to the Processor Application 184 (see FIG. 5) to work on a shift that is completed. The objective is to find all violations in given video material and create violation records with attached video clips and images. Those violation records are then submitted to the cloud database 95 for further review. At start-up, the processor 90 needs to provide credentials to log on. The processor application 184 (FIG. 5) communicates with the REST service interface of cloud 90 for authentication. Upon success, the processor thin client 90 can either resume a previously started shift, or request a new shift. The ASP 70 may set system configuration parameters to control whether a processor thin client 90 only works on shift data that was generated by a particular site or a set of sites, or if all shift data is available to be processed by any processor thin client 90. When a processor thin client 90 decides to start working on a particular shift, that shift is marked as being processed. No other processor thin client 90 will be able to work on the shift at that time. When the processor thin client 90 is finished working on the shift it is marked as completed. If the shift could not be completed it is marked as "partially completed" and a different processor user can resume working on that shift. If a processor thin client 90 has logged off the system before completing a shift, the shift is automatically be marked as "partially completed" after a given time interval of inactivity that can be configured by system configuration parameters. Initially the processor application 184 downloads most shift related data that is located on the cloud database 95, inclusive of the following:

Shift start and end date and time
Timestamps GPS locations
Video storage location Information about drivers and cars is not included and remains unknown to the processor thin client 90. Information about the timestamp and GPS location may be included, if so configured in the configuration parameters. The video storage location provided is the base URL of the video at vault 80 that the processor thin client 90 can use to retrieve video footage. Depending on the system's configuration it may be at a centralized storage location, or kept at the individual site locations. Again, one shift can consume up to 512 GB of storage, therefore it is not feasible for the Processor Application 184 to download the entire footage for processing. It rather streams the lower resolution footage that was created when the shift data was uploaded to vault 80.

Each subsequent request to review video by processor thin client 90 or by police through web application 55 is simply a click-through on the URL link. If the requestor is authorized, the request is routed to the vault 80, and once delivered to the access controller 81, the request is acted upon. The access controller acts to accept the request or to reject the request. If the request is rejected, access to the requested data storage element 86 is denied. If, conversely, the request is accepted, the access controller 81 provides access by the remote computer to the vault 80 and the selected data storage element 86 thereof. In all cases, audit entries are logged in the audit record 89. In operation, the access controller 81 further includes a certificate issuer (CI) 32 (FIG. 5). When a computer sends a request, the certificate issuer 32 generates a certificate for issuance to the requester, if appropriate. The certificate is then used by the requesting device to gain access to a database 86. The access controller 81 grants, or denies, access to the databases 86 based upon the values of the client identifier and the issued certificate contained in the request. The certificate identifies a requester and comprises, e.g., a conventional, SSL certificate. Similarly, access to the audit records 89 is also controlled by the access controller 81. The use of digital certificates is explained in detail below.

Figure 8:
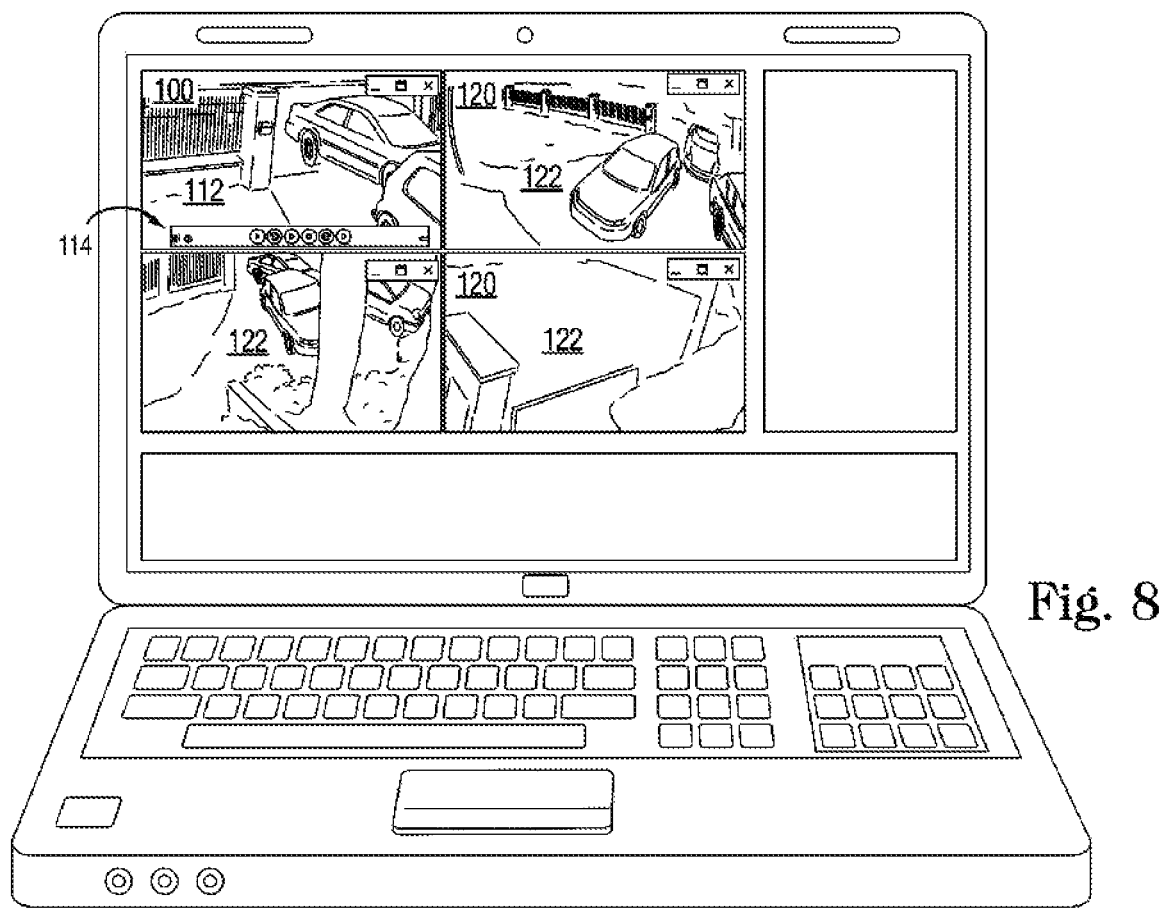
FIG. 8 is a screen print of the processor application 184 screen.

FIG. 8 is a screen print of the processor application 184 screen, which is divided into three sections:
 1. Shift Browser (lower)
 2. Video/Map Display (upper left)
 3. Violation Display (upper right)

Figure 9:
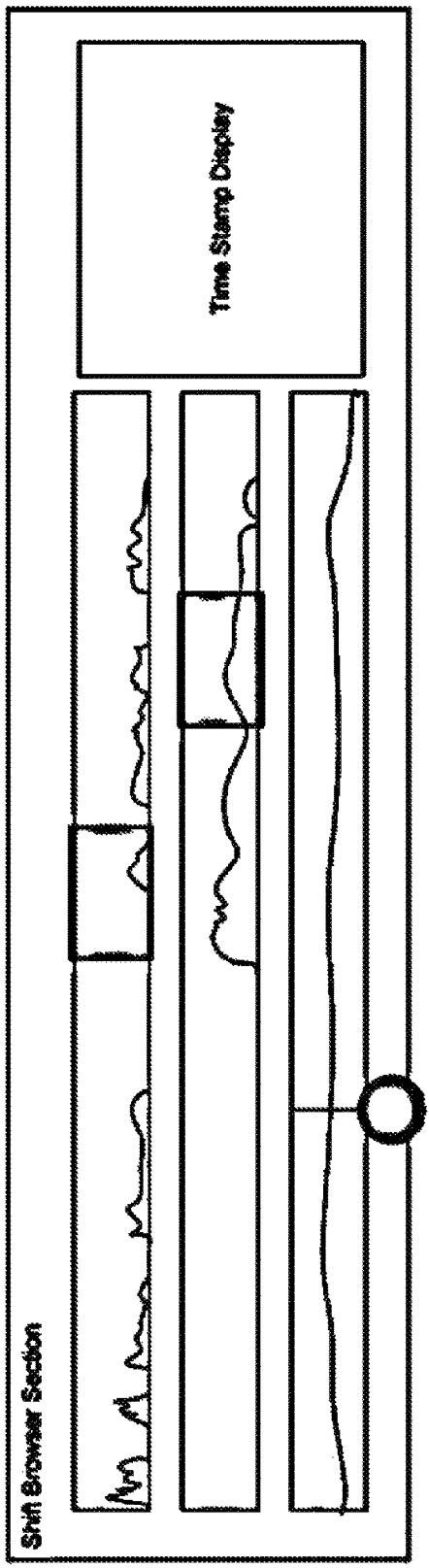
FIG. 9 is a screen print of the Shift Browser.

On top of those sections is a menu and tool buttons that provide general functionality such as:
 Log on
 Log off
 Get new shift
 Resume shift
 Submit violation
 Show user statistics FIG. 9 is a screen print of the Shift Browser (lower) which displays the shift graphically in three horizontal bars on the screen. The x-axis represents the time, the y-axis represents the speed of the mobile unit at a given moment of time. Each of the three bars uses a different time scale. The "windows" of the upper two bars show the respective range of the bar below. The upper bar shows the entire shift. The middle bar shows only the data of the first bar's selected window. The lower bar show the data of the middle bar's selected window. In essence, the three bars provide a view of three different fixed zoom levels of the entire shift's car movements. Next to the three bars is a list of the time stamps that were created during the shift, when the driver or passenger pushed the trigger 65 to mark a violation. Finally the selector in the lower bar points to the exact moment of time of the frame that is shown in the Video/Map display. Using a mouse, the windows/selector can be moved, or the bar itself can be moved to change the position of the window or selector. If the user click on a time stamp, all three bars will instantly switch to the time stamp's position. The Shift Browser also includes a display that shows the absolute time of the selector. Upon initialization a single frame for each camera and each possible position of the top bar window is downloaded. This provides for instant feedback when the processor thin client 90 moves the top bar. Upon initialization and every time the top bar window is repositioned, a single frame for each camera and each possible position of the middle bar window is downloaded. This provides for instant feedback when the user moves the middle bar. Every time the selector is moved, the Processor Application 184 restarts streaming the low resolution video footage from the new selector position. If enough bandwidth is available, frames can be pre-fetched for the lower bar as well. All downloaded frames are cached locally until the shift is marked as completed.

Figure 10:
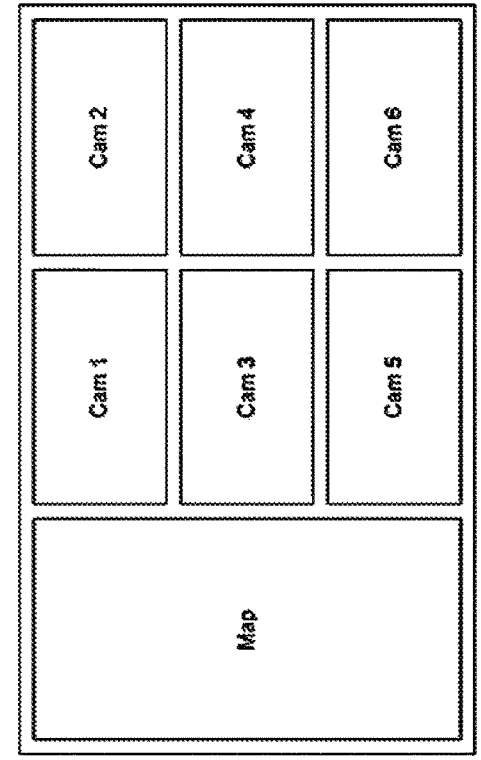
FIG. 10 is a diagram of the layout of the Video and Map display section.

FIG. 10 is a diagram of the layout of the Video and Map display section, where all 6 camera images as well as the mapped position at a given point of time are shown. That point of time is determined by the selection of the above described Shift Browser. Changing the bars, bar windows, or selector will update the frames in the 6 camera views as well as the map location. When the user double clicks on any one of the six camera windows, a full screen video display opens up and plays the original high resolution video stream of that camera, starting at the currently selected frame. This is necessary if the quality of the low resolution images is not sufficient, or a violation has been identified and the footage needs to be isolated.

Figure 11:
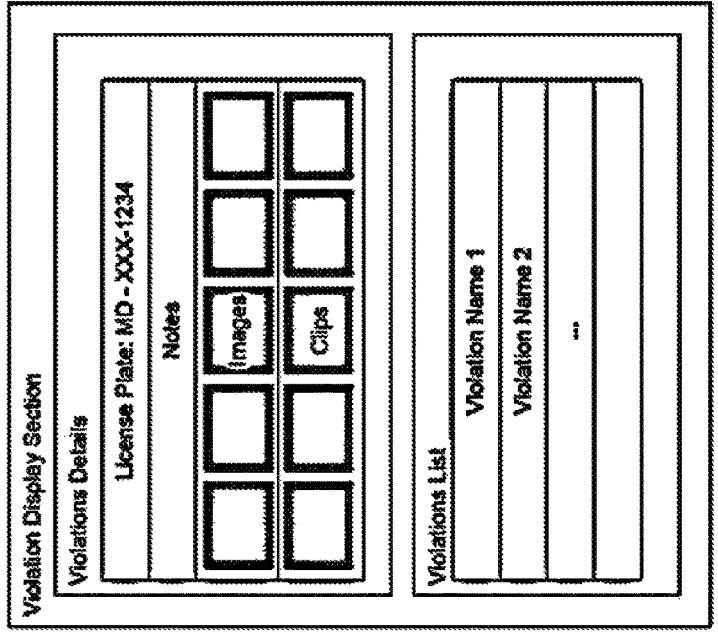
FIG. 11 is a screen print of the Violation Display.

FIG. 11 is a screen print of the Violation Display. The processor thin client 90 (FIG. 1) uses the violation display section to create new violation records or review previously created records. A violation record consists of multiple video clips and images that are isolated and selected using the Shift Browser. When the processor 90 selects the violation by clicking on a list item, the violation details part of the section shows license plate, images, clips, and additional notes. License plate and notes can be edited. Images and clips can be added and deleted. When a violation is considered complete, the processor 90 can submit it to the database 12. It now becomes "read only", and can no longer be edited. If the processor 90 stops working on a shift and a different processor resumes, all previous violations are visible (as "read only"). This is to avoid having duplicate violations recorded.

Given the foregoing, the processors 90 can remotely via their thin clients investigate each potential infraction, filter out non-infractions, and designate "apparent" infractions. At each designation of an apparent infraction the processor thin client 90 automatically (or with manual input assistance) compiles an apparent infraction record. The apparent infraction record includes time/date, address/location (mapped by GPS coordinates), violation type, vehicle plates (visually observed in the videos), a URL link request for video to the data vault 80. All apparent infraction records may be transmitted to police by web interface 55 or email. Thus using a standard computer and web application 55, police (approval officers 52 of FIG. 1) can click on each link thereby initiating the same master/slave user interface, to verify each traffic infraction individually or synchronously viewing any/all of the relevant video streams or any frame/portion thereof. The approval officer 52 portal to web interface 55 facilitates composition of a police citation, and the chain of custody of videos and infraction data have been embedded throughout the process to ensure evidentiary chain of custody.

The web application 55 may also assist police in issuing a citation, which is then sent by ASP 70 via mailer 75 to the violator 100 including instructions for payment. Once payment is secured and processed within a certain time frame, the violations are logged as complete. The violator can file for a court appearance to contest the violation at which time court documents are generated to close the violation.

It should now be apparent that the above-described invention offers a turnkey solution in the form of a mobile traffic violation detection and recording system for enforcement of traffic violations especially infractions of hands free laws against texting while driving, talking on a mobile phone while driving, and distracted driving.

Having now fully set forth the preferred embodiment, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A mobile traffic violation detecting system, comprising:
   a mobile imaging unit including a plurality of video cameras housed in a unit and attached to a vehicle, an interior module comprising a computer storage device, a user-input device for allowing a vehicle operator to designate a time and date of a visually-observed potential traffic infraction, and a computer programmed with software configured to compile a plurality of said designations into a list of potential infractions;
   a data vault for securely storing said list of potential infractions and video from each of said multiple video cameras;
   a processor client application comprising software configured to present a first user interface for allowing a third party to review each potential infraction on said list of potential infractions and correlated video stored in said data vault and to designate a subset of apparent violations therefrom, and a web-based client application comprising software configured to present a second user interface for allowing authorized law enforcement officials to review said subset of apparent violations and generate traffic citations therefrom.

2. The mobile traffic violation detecting system according to claim 1, wherein said mobile imaging unit comprises six video cameras having focal axes oriented at 45 degree offsets.

3. The mobile traffic violation detecting system according to claim 1, wherein said interior module comprises a dockable computer storage device.

4. The mobile traffic violation detecting system according to claim 1, wherein said interior module comprises a wireless computer storage device.

5. The mobile traffic violation detecting system according to claim 1, wherein said interior module computer comprises a laptop.

6. The mobile traffic violation detecting system according to claim 1, wherein said interior module comprises a GPS sensor.

7. The mobile traffic violation detecting system according to claim 1, wherein said mobile imaging unit further comprises a power-on-ethernet hub.

8. The mobile traffic violation detecting system according to claim 7, wherein said plurality of video cameras are each connected to said power-on-ethernet hub.

9. The mobile traffic violation detecting system according to claim 8, wherein said power-on-ethernet hub is connected to said interior module.

10. A mobile traffic violation detecting system, comprising:
    a mobile imaging unit including six video cameras housed in a unit and attached to a vehicle, an interior computer storage device, a user-input device for allowing a vehicle operator to designate a time and date of a visually-observed potential traffic infraction, and a computer controller for compiling a plurality of said designations into a list of potential infractions;
    a data vault for securely storing said list of potential infractions and video from each of said multiple video cameras; a processor client application comprising software configured to present a first user interface for allowing a third party to review each potential infraction on said list of potential infractions and correlated video stored in said data vault and to designate a subset of apparent violations therefrom; and
    a web-based client application comprising software configured to present a second user interface for allowing authorized law enforcement officials to review said subset of apparent violations and generate traffic citations therefrom.

11. The mobile traffic violation detecting system according to claim 10, wherein said mobile imaging unit comprises six video cameras having focal paths oriented at 45 degree offsets.

12. The mobile traffic violation detecting system according to claim 1, wherein said first user interface provides a video playback interface.

13. The mobile traffic violation detecting system according to claim 12, wherein said video playback interface is actuated by a URL link to said data vault.

14. The mobile traffic violation detecting system according to claim 10, wherein said interior module comprises a laptop and GPS sensor.

15. The mobile traffic violation detecting system according to claim 10, wherein said mobile imaging unit further comprises a power-on-ethernet hub.

16. A mobile traffic violation detecting system, comprising:
    a mobile imaging unit including a plurality of video cameras and an Ethernet hub all attached to a roof of a vehicle by a rooftop carrier, and all of said plurality of video cameras being electrically connected to said Ethernet hub, said mobile imaging unit also including an interior module comprising a computer connected to the Ethernet hub of said mobile imaging unit, computer storage media, a user-input device, and software programmed to allow a vehicle operator to designate a time and date of a visually-observed potential traffic infraction and for compiling a plurality of said designations into a list of potential infractions.

17. A mobile traffic violation detecting system, comprising:
    a mobile imaging unit including a plurality of video cameras housed in a unit and attached to a vehicle, an interior module comprising a computer storage device, a user-input device for allowing a vehicle operator to designate a time and date of a visually-observed potential traffic infraction, and a computer programmed with software configured to compile a plurality of said designations into a list of potential infractions;
    a data vault for securely storing said list of potential infractions and video from each of said multiple video cameras;
    a processor client application comprising software configured to present a first user interface for allowing a third party to review each potential infraction on said list of potential infractions and correlated video stored in said data vault and to designate a subset of apparent violations therefrom, and a web-based client application comprising software configured to present a second user interface for allowing authorized law enforcement officials to review said subset of apparent violations and generate traffic citations therefrom.

18. The mobile traffic violation detecting system according to claim 17, wherein said first user interface provides a video playback interface.

19. The mobile traffic violation detecting system according to claim 18, wherein said video playback interface is actuated by a URL link to said data vault.

20. The mobile traffic violation detecting system according to claim 10, wherein said interior module comprises a GPS sensor.

\* \* \* \* \*